United States Patent [19]

Park

[11] Patent Number: 5,456,038
[45] Date of Patent: Oct. 10, 1995

[54] FISHLINE GUIDER PIPE ASSEMBLY HAVING SCREWED GUIDER FOR INTERNAL FISHLINE TYPE FISHING ROD

[75] Inventor: Bo K. Park, Pusan, Rep. of Korea

[73] Assignee: Silver Star Co., Ltd., Pusan, Rep. of Korea

[21] Appl. No.: 247,961

[22] Filed: May 23, 1994

[30] Foreign Application Priority Data

Oct. 12, 1993 [KR] Rep. of Korea .................. 1993-21131

[51] Int. Cl.[6] ..................................................... A01K 87/04
[52] U.S. Cl. ................................................ 43/24; 43/18.1
[58] Field of Search ........................................ 43/18.1, 24

[56] References Cited

U.S. PATENT DOCUMENTS

| | | | |
|---|---|---|---|
| 1,595,275 | 8/1926 | White | 43/24 |
| 2,324,429 | 7/1943 | Rondelli | 43/18.1 |
| 2,776,516 | 1/1957 | Jennette | 43/24 |
| 3,222,811 | 12/1965 | Henson | 43/18.1 |
| 3,874,060 | 4/1975 | Barnes | 43/18.1 |
| 4,212,126 | 7/1980 | Barnett | 43/24 |
| 5,159,776 | 11/1992 | Horton | 43/24 |

FOREIGN PATENT DOCUMENTS

| | | | |
|---|---|---|---|
| 1332647 | 6/1963 | France | 43/18.1 |
| 146755 | 7/1920 | United Kingdom | 43/24 |
| 1259820 | 1/1972 | United Kingdom | 43/24 |

Primary Examiner—Kurt Rowan
Attorney, Agent, or Firm—Richard T. Holzman

[57] ABSTRACT

A fishline guider pipe assembly having a detachably screwed guider for an internal fishline type fishing rod. The assembly includes a fishline guider pipe having an inner threaded hole at its middle section and fitted to front and rear pipe pieces of the fishing rod at its hollowed front and rear pipe sections. The inner threaded hole slopes down to the front pipe section and opens to the outside of the guider pipe and to the inside of the front pipe section. The inside end of the inner threaded hole is reduced in its diameter to form an annular stop. The outer threaded cylindrical guider is screwed in the threaded hole for guiding a fishline to the inside of the front pipe section. The inside guide ring is interposed between the annular stop of the guider pipe and an inside end of the cylindrical guider while the outside guide ring is received in the outside end of the cylindrical guider. With this screwthreaded structure, the guider can be separated from the guider pipe when the guider needs repairing.

6 Claims, 1 Drawing Sheet

5,456,038

FISHLINE GUIDER PIPE ASSEMBLY HAVING SCREWED GUIDER FOR INTERNAL FISHLINE TYPE FISHING ROD

FIELD OF THE INVENTION

The present invention relates in general to an internal fishline type fishing rod passing the fishline therethrough exiting its distal end and, more particularly, to a fishline guider pipe assembly having a fishline guider for such a fishing rod.

BACKGROUND OF THE INVENTION

In order to overcome problems caused by an exposed fishline of a conventional external fishline type fishing rod, there has been proposed an internal fishline type fishing rod wherein the fishline is guided into the fishline path of a hollow fishing rod body in order to come out of the distal end of the fishing rod body, hiding the fishline from view. A fishline guider pipe is provided for this type fishing rod and introduces the fishline from a spinning reel into the fishline path inside the hollow fishing rod body. The guider pipe is fitted to fishing rod pipe pieces at its opposed ends and includes a fishline guider at its middle section for guiding the fishline to the fishline path of the rod body.

A fishline guider pipe has been proposed which is cast with a fishline guider as a single body. However, such a fishline guider pipe has a problem in that it requires a high level of precision in its production. Furthermore, since the fishline guider pipe and its fishline guider are cast as a single body, it is impossible to separate the fishline guider from the guider pipe so that the guider pipe cannot be discarded particularly when its parts including the fishline guider are worn or damaged.

SUMMARY OF THE INVENTION

It is, therefore, an object of the present invention to provide a fishline guider pipe assembly for an internal fishline type fishing rod in which the aforementioned problems caused by the conventional guider pipe can be overcome which comprises a fishline guider pipe provided with an inner threaded sloping hole at its middle section and receiving an outer threaded cylindrical guider in the inner threaded hole by screwing the guider into the hole with interposition of an inside guide ring at the inside end of the guider and insertion of an outside guide ring into an outside end of the guider, thus to separate the guider from the fishline guider pipe particularly when the fishline guider is worn or damaged and needs repairing.

In order to accomplish the above object, a fishline guider pipe assembly for an internal fishline type fishing rod comprises a fishline guider pipe having and inner threaded hole at its middle section and fitted to front and rear pipe pieces of the fishing rod at its hollowed front and rear pipe sections, the inner threaded hole sloping down to the front pipe section and opening to the outside of the guider pipe and to the inside of the hollowed front pipe section at its outside and inside ends respectively, the inside end of the inner threaded hole being reduced in its diameter in order to form an annular stop; an outer threaded cylindrical guider screwed in the inner threaded hole for guiding a fishline to the inside of the hollowed front pipe section; an inside guide ring interposed between the annular stop of the guider pipe and an inside end of the cylindrical guider; and an outside guide ring received in an outside end of the cylindrical guider.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
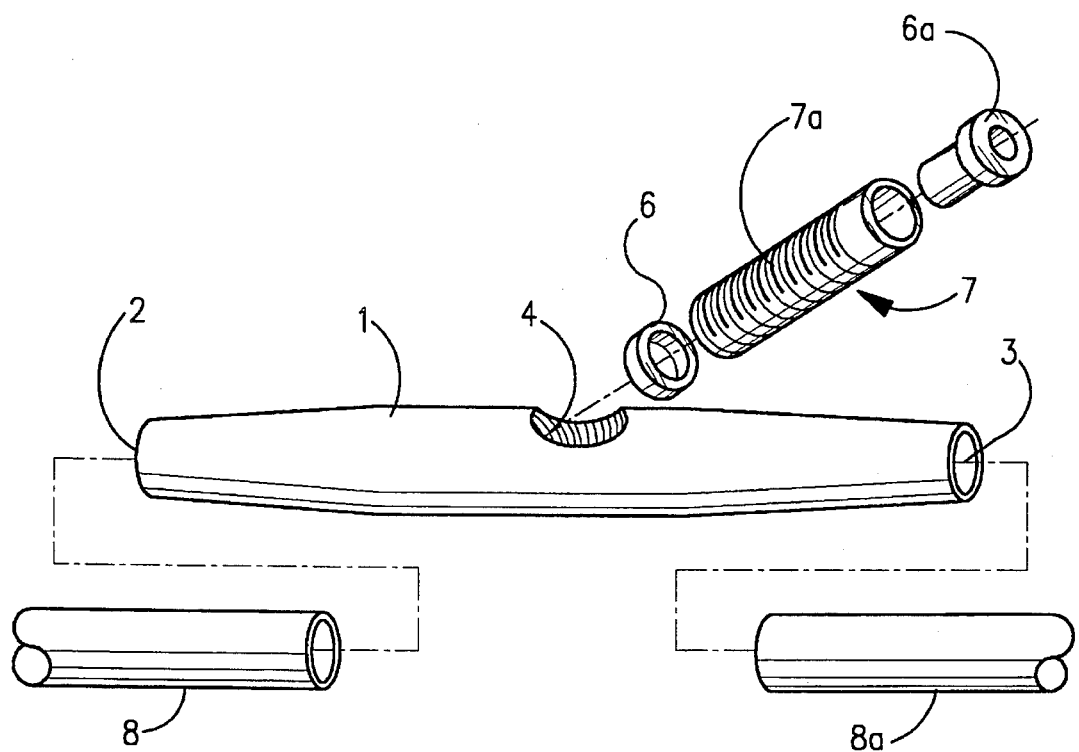
FIG. 1 is an exploded perspective view of an internal fishline type fishing rod having a fishline guider pipe assembly according to a preferred embodiment of the present invention.
Figure 2:
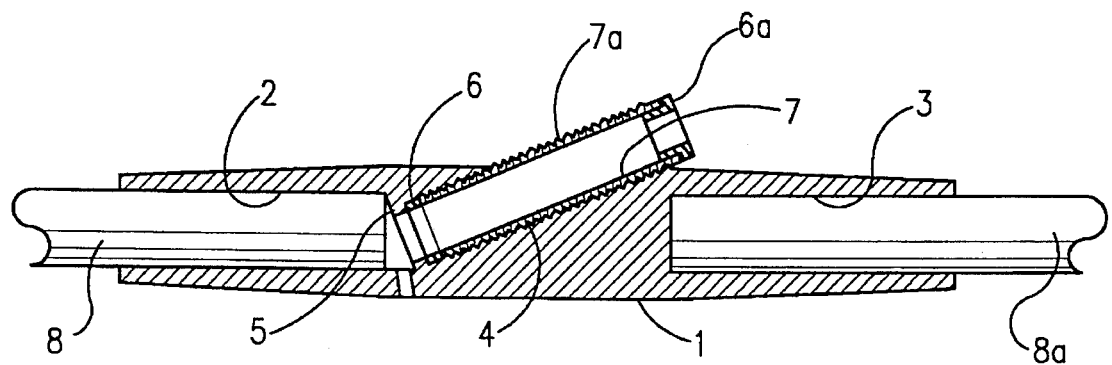
FIG. 2 is a longitudinal sectional view of the fishline guider pipe assembly of FIG. 1.

With reference to the drawings, there is shown an internal fishline type fishing rod having a fishline guider pipe assembly in accordance with a preferred embodiment of the present invention. The guider pipe assembly includes a fishline guider pipe 1 which is hollowed at its opposed end sections for forming connection pipe sections 2 and 3 at those ends. At connection pipe sections 2 and 3, fishline guider pipe 1 is fitted to a front fishing rod pipe piece 8 and a rear fishing rod pipe piece 8a or a fishing rod handle respectively. In fitting fishline guider pipe 1 to pipe pieces 8 and 8a, it is preferred to tightly insert the insert ends of pipe pieces 8 and 8a into hollowed connection pipe pieces 2 and 3 respectively as shown in FIG. 2. Guider pipe 1 also includes an inner threaded hole 4 at its middle section. The inner threaded hole 4 opens to the outside at its outside end, slopes down to front pipe section 2 and communicates with the inside of hollowed front pipe section 2 at its inside end. The inside end of hole 4 is reduced in its diameter for forming an annular stop 5.

The guider pipe assembly also includes a cylindrical fishline guider 7 which is lengthwise hollowed and threaded on its outer surface 7a. This guider 7 is screwed into inner threaded hole 4. When screwing fishline guider 7 into hole 4, an inside guide ring 6 is received in hole 4 prior to the screwing of fishline guider 7 such that it is seated on annular stop 5 and will be interposed between the inside end of fishline guider 7 and annular stop 5. An outside guide ring 6a having an enlarged stop end is tightly inserted into the outside end of fishline guider 7. When inserting outside guide ring 6a into the outside end of guider 7, the enlarged stop end is closely seated on the end surface, thus to cover and protect the end surface of guider 7. Here, it is preferred to insert outside ring 6a into the outer side end of guider 7 prior to screwing guider 7 into hole 4.

In assembling the fishing rod having the above fishline guider pipe assembly, outside guide ring 6a is inserted into the outside end of outer threaded guider 7. This guider 7 is, thereafter, screwed into the inner threaded sloping hole 4 of guider pipe 1 with interposition of inside guide ring 6 between its inside end and annular stop 5 of hole 4. Upon finishing the assembling of the guider pipe assembly, front and rear pipe pieces 8 and 8a of the fishing rod are inserted into pipe sections 2 and 3 of guider pipe 1 respectively.

Briefly described, fishline guider pipe 1 includes on its middle section inner threaded sloping hole 4 which slopes down to front pipe section 2 and opens to the inside of front pipe section 2 and to the outside of guider pipe 1 at its opposed ends. Outer threaded guider 7 receiving outside guide ring 6a is screwed into hole 4 with interposition of inside guide ring 6 between its inside end and annular stop 5 of hole 4. Since guider 7 is detachably screwed into hole 4, guider 7 can be loosened and easily separated from fishline guider pipe 1 particularly when it is worn or damaged and needs repairing. The fishline guider pipe assembly thus provides a convenience in maintaining and repairing parts of the internal fishline type fishing rod and, furthermore, achieves a desired strength of the fishing rod.

As described above, the fishline guider pipe assembly according to the present invention comprises a guider pipe fitted to pipe pieces at its opposed ends and having an inner threaded sloping hole at its middle section. An outer threaded cylindrical guider tightly receiving an outside guide ring at its outside end is screwed into the inner threaded hole of the guider pipe with interposition of an inside guide ring between its inside end and an annular stop of the inner threaded hole. With the screwing structure of the fishline guider pipe assembly, it is possible to separate the fishline guider from the guider pipe particularly when the guider needs repairing. The screwing structure also provides a desired strength for the fishline guider pipe assembly.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A fishline guider pipe assembly for an internal fishline type fishing rod comprising:

a fishline guider pipe hollowed at its front and rear pipe sections and having an inner threaded hole at its middle section;

front and rear pipe pieces of the fishing rod fitted to the fishline guider pipe at said hollowed front and rear pipe sections;

an outer threaded lengthwise hollowed cylindrical guider screwed in said inner threaded hole for guiding a fishline to the inside of said hollowed front pipe section; and inside and outside guide rings received in said cylindrical guider.

2. The fishline guider pipe assembly according to claim 1, wherein said inner threaded hole slopes down to said hollowed front pipe section and opens to the outside of the fishline guider pipe and to the inside of said hollowed front pipe section at its outside and inside ends respectively.

3. The fishline guider pipe assembly according to claim 1, wherein said inside end of said inner threaded hole is reduced in its diameter in order to form an annular stop.

4. The fishline guider pipe assembly according to claim 3, wherein the inside guide ring is interposed between said annular stop of the guider pipe and an inside end of said cylindrical guider.

5. The fishline guider pipe assembly according to claim 1, wherein the outside guide ring is received in an outside end of said cylindrical guider.

6. The fishline guider pipe assembly according to claim 1, wherein said rear pipe piece of the fishing rod is a fishing rod handle.

* * * * *